United States Patent [19]
Clark

[11] 3,957,455
[45] May 18, 1976

[54] CHARCOAL IGNITING DEVICE

[75] Inventor: Roger S. Clark, Littleton, Colo.

[73] Assignee: Johns-Manville Corporation, Denver, Colo.

[22] Filed: Sept. 24, 1973

[21] Appl. No.: 400,103

[52] U.S. Cl. ........................................ 44/35; 44/38
[51] Int. Cl.² .................... C10L 11/08; C10L 11/00
[58] Field of Search .............. 44/34, 35, 38, 40, 41; 126/59.5; D48/27

[56] References Cited
UNITED STATES PATENTS

| | | | |
|---|---|---|---|
| 3,116,704 | 1/1964 | Byars, Sr. et al. ............. | 126/59.5 X |
| 3,374,071 | 3/1968 | Corriher, Jr. et al. ............. | 44/40 X |
| 3,413,967 | 12/1968 | Hoock .............................. | 126/59.5 |
| 3,540,865 | 11/1970 | Pape .................................. | 44/41 X |
| D223,722 | 5/1972 | Stehouwer ......................... | D48/27 |

FOREIGN PATENTS OR APPLICATIONS

| | | | |
|---|---|---|---|
| 7,989 | 5/1888 | United Kingdom................. | 44/34 A |
| 9,698 | 7/1891 | United Kingdom................. | 44/34 A |

Primary Examiner—Carl F. Dees
Attorney, Agent, or Firm—Robert M. Krone; Joseph J. Kelly; James W. McClain

[57] ABSTRACT

A portable charcoal igniter device is disclosed, consisting of an upright hollow body with a plurality of air intake openings disposed at the lower end thereof. The device is composed of inorganic fibers, binder, and an optional filler.

7 Claims, 1 Drawing Figure

U.S. Patent May 18, 1976 3,957,455
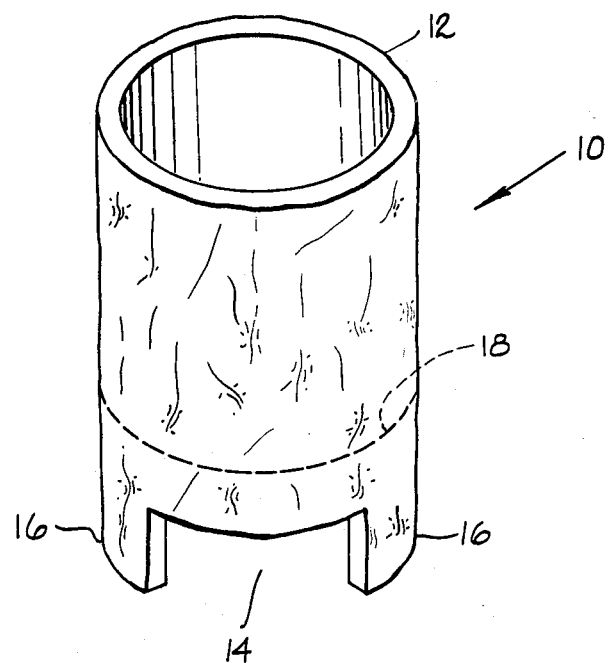

CHARCOAL IGNITING DEVICE

BACKGROUND OF THE INVENTION

The invention herein relates to portable devices for igniting charcoal or charcoal briquets. It is of particular use with ordinary home barbecues.

There are a number of ways to ignite the charcoal in a conventional barbecue. Most commonly a layer of charcoal or charcoal briquets is laid in the bottom of the barbecue pan, soaked with an inflammable fluid, and the fluid ignited. The fluid is consumed rapidly, and as much of the heat is dissipated, the degree of ignition of the charcoal is often poor. Electrical resistance heating devices may also be inserted in charcoal beds, but they serve to ignite only those briquets which are directly in contact with them so that once again the degree of ignition of the charcoal bed is quite poor. In an attempt to obviate these problems with the commonly used ignition schemes "chimney" devices have been used. These are commonly in the shape of a hollow vertical cylinder (such as a coffee can) into which the charcoal briquets are placed. Air enters at the lower end of the cylinder, where combustible material is burned. A typical example is shown in U.S. Pat. No. 3,739,732. In operation the combustible material at the lower end of the cylinder is ignited and the charcoal is thereafter ignited as the heat rises through the stacked charcoal inside the cylinder.

The chimney devices of the prior art have been found to have distinct disadvantages, however. (1) Most require some sort of fuel reservoir and utilize a flammable liquid fuel; a typical example is the burner shown in the aforesaid U.S. Pat. No. 3,739,732. The hazards of using flammable liquid charcoal igniters are well known. (2) The chimney devices are conventionally made of metal, usually an inexpensive grade of sheet steel. Such metal containers are extremely inefficient in heat conservation and much of the heat derived from the combustion of the fuel is dissipated through the cylinder walls. The heat thus wasted is of course not available for its intended use, which is to ignite the charcoal. In addition, steel oxidizes at the temperatures of operation and the life of steel devices is thus quite limited. (3) The metal containers themselves become extremely hot and the user must handle them with special tongs, handles or some other device to remove them from the barbecue after the charcoal is ignited. If he were to try to handle a heated charcoal igniter with his bare hands, the user would probably suffer severe burns. Also, the hot metal container poses a severe risk to others (especially children) who may touch it before it has had time to cool off after it is removed from the barbecue. (4) Finally, many of the chimney igniter devices are of fairly complex construction. Some, for instance, require that the device be inverted to empty the ignited charcoal into the barbecue grill. Such complex configurations, of course, add to the initial cost of the device, make it difficult to use, and render it susceptible to malfunction in service.

It is an object of this invention to provide a charcoal igniting device which is very simple in design and can be readily and economically fabricated.

It is further an object of this invention to provide a device with a high thermal efficiency in which a very high proportion of the heat produced is utilized for igniting the charcoal.

It is also an object of this invention to provide a device which can be readily handled with the bare hands and which offers a high degree of safety to the user and others in its vicinity.

It is further an object of this invention to provide an igniter device which may be reused many times and with which there is virtually no opportunity for malfunction.

It is further an object of this invention to provide an igniter device which does not require the use of any flammable liquid or other hazardous substance.

BRIEF SUMMARY OF THE INVENTION

The objects of this invention are accomplished by the instant invention, which is a portable charcoal lighter comprising a generally vertical hollow container open at the top and the bottom and having generally vertical side walls, said side walls having a plurality of openings in the lower portion thereof, with said container being a unitary body composed of inorganic fibers and binder. The binder may contain some organic matter but will normally be substantially inorganic. Further, the composition of the device may contain a certain amount of a filler material.

BRIEF DESCRIPTION OF THE DRAWING

The single FIGURE of the drawing represents pictorially a typical igniter device of the present invention.

DETAILED DESCRIPTION AND PREFERRED EMBODIMENTS

The device of this invention is best described initially by reference to the attached drawing. The device itself, generally illustrated at 10, is a hollow vertical container for the charcoal or charcoal briquets. In the FIGURE the cross-sectional shape illustrated is circular, but it will be immediately apparent that any other suitable shape, such as square, hexagonal, octagonal, rectangular, etc., will be equally satisfactory. The device is a unitary object having relatively thin vertically disposed side walls designated 12. The composition of these side walls will be described below. At the lower end of the side walls are a plurality of openings, one of which is shown in the FIGURE and designated 14. These openings serve to permit air to be drawn into the chimney container and also provide access by which the combustible material to be placed in the bottom of the container can be readily ignited. In the drawing, the opening 14 illustrates one of a series of openings formed in the lower edge of the container and alternating with the supports or legs 16. The openings need not be in this form, however, but rather may be in the form of a series of perforations through the side walls and disposed above the lower edge of the container, so that the lower edge is unbroken. The form illustrated is preferred, however, for the device containing this type of opening may be readily fabricated in a single molding operation, thus providing the most economical method of fabrication available. The size of any openings will be dependent on the number of openings and their location, but in any event will be large enough to permit the intake of ample air for combustion. In the configuration shown in the FIGURE, the openings 14 are each typically from 1 to 4 inches wide and ½ to 2 inches high.

The diameter of the axial vertical opening through the device is not critical, but can vary depending on the form of the charcoal which is to be placed in it and on the amount of charcoal to be contained. I have found that when conventional charcoal briquets, of the type normally sold for home barbecue use (with dimensions of about 2 inch × 2 inch × 1 inch), are used, a diameter of from 4 to 12 inches is entirely satisfactory. ("Diameter" as used herein refers not only to the major dimension of a circular opening, but also to the equivalent major dimension of a swuare or other polygonal opening.) The walls of the device will then have a thickness of from 7/16 to 1-½ inches, preferably from about ½ to ¾ inch. The vertical height will depend on the amount of charcoal which is to be contained, but I have found that heights of from 4 to 18 inches, preferably 6 to 12 inches, are quite satisfactory and normally will contain and rapidly ignite an ample amount of charcoal for the barbecuing of a meal for a family. Maximum and minimum limits for the inside diameter and vertical height of the device are not critical. However, the minimum should be such that a sufficient amount of charcoal can be contained in the device, and if the device is too large, the heating rate of the charcoal will be adversely effected.

The side walls of the device are constructed of inorganic, preferably refractory, fiber and binder, and optional filler material may also be present. The inorganic fibers useful comprise the common manufactured or synthetically formed fibers (as opposed to natural mineral fibers such as asbestos) possessing good integrity and thermal properties at temperatures up to about 600° or higher. Many such inorganic fibers are known in the art. They generally comprise fibers formed from melts of compositions predominately of silica or silicates of calcium, aluminum and the like di- or tri-valent metals or of mixtures of the various oxides and silicates. These materials include the familiar rock wools, mineral or slag wools, glass wools or fibers and particularly the refractory fibers consisting of alumina and silica or alumina and silica with added oxides such as titania, zirconia, chromia or boron materials in addition to pure silica fibers. Mixtures of these various types of fibers may also be used. The inorganic fibers will be present as from 40 to 95 weight percent of the composition, and preferably as from about 45 to 90 weight percent.

The binder present will normally be a wholly inorganic material, although small amounts of organic materials may also be used. The inorganic binders preferably comprise clays such as bentonite or hectorite, alkali metal silicate binders such as sodium or potassium silicate, borax, phosphoric acids and assorted phosphates or salts such as aluminum phosphates, colloidal mica, colloidal silica, colloidal alumina and the like. Mixtures of two or more of these materials may also be used. The organic materials may comprise resins, starch, glues, dextrin, polysaccharide gums, drying oils and the like. These will normally be burned out wholly or partially when the device is in service, but are nevertheless desirable in that they aid in maintaining structural integrity during fabrication when the material is in its wet or "green" condition. Since the device is intended to be used for home barbecues, however, the particular inorganic binder chosen should be one which does not emit any noxious or hazardous gases during combustion. Thus, a material such as starch is ordinarily preferred. Since the organic matter will be burned out early in the life of the device, it should also be chosen at least in part for its low cost; again starch is a preferred material on this basis.

The total binder will be present as from 5 to 60 weight percent of the composition, and preferably as from about 10 to 45 weight percent. The inorganic portion will be present as 40 to 60 weight percent, preferably 4 to 20 weight percent. The organic binder will be present as up to 20 weight percent of the composition and preferably as from about 2 to 15 weight percent.

In addition, various inorganic filler materials may also be included in the composition, usually to reduce the cost and/or to permit variation of the density of the finished object. Typical fillers include salvage or scrap from previously used or unused devices of this invention. Other filler materials include refractory grogs and particles, light weight fillers such as expanded perlite, diatomaceous earth or kyanite, kaolin, alumina, silica and the like or mixtures thereof. Since this product does not normally have to withstand temperatures in excess of 1200°F, more refractory materials are not necessary and the particular filler materials used may be chosen largely on the basis of economics. Similarly, the particular fiber and inorganic binder used may also be chosen with consideration of the economics and more refractory materials (such as those required in riser sleeve applications such as that described in U.S. Pat. No. 3,456,914) need not be resorted to if their use cannot be economically justified.

The filler will be present as up to 50 weight percent of the composition, and preferably of from 5 to 35 weight percent.

The charcoal igniters of the present invention can be formed and produced from the above compositions by means of conventional techniques for shaping and integrating a mixture of fiber and binder into a shape retaining configuration. These include common means of casting, molding, felting and the like. A preferred technique, which leads to good product uniformity and consistency, consists of integrating and consolidating a body of the desired shape from a dispersion of the ingredients in an aqueous medium by filter molding. A typical igniter can be expediently formed by vacuum filter molding with perforated or screened male or female molds defining the configuration and through which the dilute water slurry of the fiber and binder is filtered to form the solid body by accretion of the constituent materials from the liquid medium. With this technique the shaped object is immediately handleable when removed wet from the molds and will resist breakage through dropping and other abusive factory handling procedures. Other forming methods such as pan casting or press molding of concentrated slurries of the ingredients may also be used to impart the form and remove the water. Following these molding steps from aqueous medium the wet or green shape is placed in a dryer where the remaining water is driven off. Conventional dryer times and temperatures are used. All or a portion of the organic binder (such as starch) may also be driven off in the dryer operation and in fact under certain conditions such "burn-out" of the organic binder may be desired.

If desired, the molded product may be subjected to a hardening technique, in which all or a portion of the shape is dipped into a colloidal silica dispersion. Because colloidal silica is quite expensive it is often desirable to harden only the lower portion of the igniter, particularly the legs or base on which the igniter will stand when in service and the portions surrounding the openings or perforations in the igniter wall. For example, in the FIGURE that portion of the igniter below the dotted line 18 may be dipped into the colloidal silica for hardening while the portion above the line 18 is not subjected to the hardening technique. Of course the location of the line 18 is not critical, and if desired the entire object may be silica treated.

In operation the use of this device is very simple and avoids many of the hazardous or complicated steps heretofore required of the user. The igniter is placed in an upright position inside a conventional barbecue kettle or base and a small amount of combustible material, such as folded or wadded paper, wood kindling or the like is placed in the bottom of the igniter. The major portion and remainder of the igniter is then partially or completely filled with charcoal or charcoal briquets. The actual amount of charcoal to be added will easily be gauged by the user, depending on the amount of food which he wishes to cook. The combustible material is then simply ignited with a match. It will be noted that there is no need for flammable fluids, electric starters or other expensive or hazardous ignition means or fuels. Of course, individual users may wish to put some flammable liquid on the charcoal briquets or to use an electric resistance heater in place of the combustible paper or wood, but these aids are unnecessary and can be hazardous, and are therefore not recommended. Thereafter the burning of the combustible material quickly ignites the lower layers of charcoal and they in turn ignite successively higher layers. Because of the insulating nature of the present device and its chimney structure, heat utilization is highly efficient and high temperatures are rapidly obtained. For instance, I have found that temperatures of about 250°F can be obtained in five to seven minutes and temperatures on the order of 500°F or greater, perhaps as high as 1000°F to 1200°F, can be obtained in ten to twelve minutes. Thus, the charcoal very rapidly reaches the temperatures required for cooking the food, obviating the former tiresome and annoying wait by the user while charcoal which has been conventionally ignited slowly heats to the necessary cooking temperatures.

Once the desired temperature is obtained, the user merely lifts the device straight up out of the charcoal grill pan. The ignited charcoal falls through the bottom of the device and is readily distributed around the cooking surface. Despite the high temperatures obtaining inside the cylinder, the outer surface is cool to the touch and can readily be grasped with the user's bare hands. As an added advantage, the device after use can be simply set to the side with little danger that persons standing nearby, especially children, will be burned by coming in contact with it as they might be, for instance, if the prior art steel chimney devices were used and then set aside to cool down.

As a specific example of a device of this invention, a device was molded in a shape similar to that shown in the drawing on a cylindrical filter mold. The bottom edge was divided into octants and integrally molded therein were four equally spaced openings and four equally spaced legs. The solid constituents of the slurry from which the igniter was molded consisted of 64 weight percent of bulk alumina silica refractory fibers commercially available from the Johns-Manville Corporation under the trademark CERAFIBER, 7 weight percent of a colloidal silica commercially available from DuPont under the trademark "Ludox", 5 weight percent of starch and 24 weight percent of a clay filler. The shaped object resulting from molding was dried, then dipped in a colloidal silica dispersion so that approximately the lower ¼ of the was silica was hardened. The shaped object was thereafter again dried and was used as a highly efficient charcoal igniter. The combustible material found best suitable was folded newspaper.

What is claimed is:

1. A portable charcoal lighter device having high thermal efficiency comprising a generally vertical hollow container open at the top and bottom and having generally vertical side walls, said side walls having a plurality of air intake openings in the lower portion thereof, with said container being a unitary body comprising a predominant amount of inorganic fiber and binder therewith.

2. The device of claim 1 wherein said openings comprise a series of openings formed in the lower edge of said container and alternating with a series of supports.

3. The device of claim 1 wherein said openings comprise a series of perforations in the lower portion of said container above the lower edge thereof.

4. The device of claim 1 wherein said body comprises 40 to 95 weight percent inorganic fiber and 5 to 60 weight percent binder.

5. The device of claim 4 also containing up to 50 weight percent filler.

6. The device of claim 5 wherein said inorganic fiber is a refractory fiber.

7. The device of claim 1 produced by filter molding from an aqueous dispersion of inorganic fiber and binder.

* * * * *